United States Patent
Botros et al.

(10) Patent No.: US 6,341,857 B1
(45) Date of Patent: Jan. 29, 2002

(54) INK SET FOR A MULTI-COLOR, HIGH SPEED CONTINUOUS INK JET PRINTER

(75) Inventors: Raouf Botros, Centerville; Michael J. Piatt, Kettering, both of OH (US)

(73) Assignee: Scitex Digital Printing, Inc., Dayton, OH (US)

( * ) Notice: Subject to any disclaimer, the term of this patent is extended or adjusted under 35 U.S.C. 154(b) by 0 days.

(21) Appl. No.: 09/574,037

(22) Filed: May 18, 2000

(51) Int. Cl.⁷ .................................................. G10D 11/00
(52) U.S. Cl. ....................................................... 347/100
(58) Field of Search ................ 347/100, 43; 106/31.27, 106/31.6, 31.13

(56) References Cited

U.S. PATENT DOCUMENTS 5,764,263 A * 6/1998 Lin ............................. 347/101

\* cited by examiner

*Primary Examiner*—John Barlow
*Assistant Examiner*—Michael S Brooke
(74) *Attorney, Agent, or Firm*—Barbara Joan Haushalter

(57) ABSTRACT

In a continuous ink jet printing system, bleed and pullback are minimized by selecting an ink set having a particular print order, with each ink having its components selected to equalize the surface tensions of the inks. By equalizing the surface tensions, the percentage of density of the primary ink which can be printed increases, thereby increasing the secondary and tertiary color gamut.

14 Claims, No Drawings

INK SET FOR A MULTI-COLOR, HIGH SPEED CONTINUOUS INK JET PRINTER

TECHNICAL FIELD

The present invention relates to inks for use in continuous ink jet printing systems and, more particularly, to a technique for matching the surface tension amongst all of the color inks used in a high speed, continuous ink jet printing system.

BACKGROUND ART

Continuous printing of variable color images at high speeds is applied to various kinds of substrates in the ink jet printing field. These substrates include uncoated, offset coated, and ink-jet coated papers. Traditionally, inks for continuous ink jet printers are obtained by dissolving water-soluble dyes in water or a mixture of water and water-soluble organic solvent(s).

In multi-color, high speed, continuous ink jet printing, the multiple colors are printed individually, typically using cyan, magenta, black and yellow. For example, to create a dark blue color on paper, the image will have cyan, magenta, and black, all in a specific area. Depending on the color, there will be various amounts of these inks. Thus, when the magenta is put down, it overlaps onto cyan. When black is put down, it overlaps onto both cyan and magenta.

This overlapping works well so long as there is not a great deal of intermingling or actual mixing of liquid drops on paper. When this happens, the color appears mottled, muddy or brownish. Also, the color changes with print speed. At slow speed, the inks have more chance to soak into the paper. At high speed, the inks tend to intermingle and the color shifts, usually appearing darker.

Another issue with high speed printing occurs at the boundaries between color patches. If, for example, a cyan area and a magenta area are immediately adjacent, one color may "bleed" into the other color.

In the existing art, these problems have been solved by drying each color ink before applying a subsequent color ink to the substrate. However, with multi-color printing, drying and paper handling for these multiple color applications can be costly.

It is seen then that there is a need for an improved technique for printing color inks which minimizes paper handling and costs, and maximizes image quality.

SUMMARY OF THE INVENTION

This need is met by the ink set according to the present invention, wherein the surface tension of every ink is configured to be approximately equal. Color-to-color bleed (when an unwanted blend of different colors occurs) and pullback (when different color inks do not properly blend) typically occur when surface tensions are unequal. With color-to-color bleed, an ink with a low surface tension will "bleed" or migrate into an area of high surface tension. Thus, if magenta ink has a lower surface tension than cyan, it will bleed into the cyan. The cyan area will then be a dark blue and the boundary between the colors will be blurred and feathery. On the other hand, if the cyan ink has a low surface tension, it will bleed into the magenta. This will happen regardless of which ink is printed first, since at high speed the ink is not completely dry as the paper passes under the subsequent color print head. This will cause the magenta area to appear blue, and again, the edges will be blurred and feathered.

The other phenomena that can occur, called "pullback", is also affected by unequal surface tensions of the inks. If an ink of very high surface tension is placed on top of an ink with very low surface tension, the high surface tension ink will pull back from the edges. This leaves an area of little or no ink where the high-surface tension ink should have been. For example, if low surface tension cyan is printed followed by a very high surface tension magenta, the magenta will pull back. This leaves an uneven, white area between colors which was not originally intended.

In accordance with one embodiment of the present invention, bleed and pullback are minimized by selecting an ink set having a particular print order, with each ink having its components selected to equalize the surface tensions of the inks. By equalizing the surface tensions, the percentage of density of the primary ink which can be printed increases, thereby increasing the secondary and tertiary color gamut.

Other objects and advantages of the invention will be apparent from the following description and the appended claims.

DETAILED DESCRIPTION OF THE INVENTION

The phenomena of bleed and pullback will occur to a greater or lesser extent, depending on factors including the substrate used, print speed, image type, print order, ink coverage (drops per spot), trapping, speed, and dryer temperature. Scitex Digital Printing, Inc., of Dayton, Ohio, has developed a four-color ink jet printing system. This system prints continuously variable color images at speeds up to 500 fpm. The system is designed to print on various kinds of substrates, including uncoated, offset coated, and ink-jet coated papers. Since this system is intended for variable imaging in a wide range of applications, the "bleed" and/or "pullback" must be minimized. The present invention, therefore, proposes an ink set with matched surface tensions.

The Scitex four-color printer is designed to put all the ink onto the paper before any drying occurs. This has the decided advantage of preventing mis-registration due to dimensional changes in the paper. Since paper expands or contracts due to moisture content, and the inks used can be as much as 95% or more water, the printing process causes local expansion of the paper. This, in turn, leads to fluting, cockling, curl, and wrinkles. Downstream operations such as slitting, folding, sheeting and stacking, then, become impractical. To maximize the image when drying occurs after all ink is printed, a print order of cyan, magenta, black and yellow is selected.

While printing all the ink before drying minimizes the paper handling problems, such an approach comes at a cost. The unwanted effects are color-to-color bleed and mottle, solved for by the present invention. The approach of simply putting down less ink would be at the cost of the overall color gamut. With the present invention, depending on the substrate being used, the printer has a color gamut of 50–80% of the standard web offset press (SWOP) color gamut.

Water, typically the major ingredient of any ink, has a surface tension of 72 dynes/cm. The ink set of the present invention preferably comprises liquid dyes that, before dilution in water, have a surface tension in the range of 60 dynes/cm. Purification processes can be applied to the inks and/or dyes to minimize unwanted metal ions, organic materials, and the like, to increase the surface tension of the dyes.

The addition of virtually any component to a dye-water mixture, however, will lower the surface tension. In accordance with the present invention, therefore, the formulation of the multi-color printer ink set specifically limits the surface-modifying ingredients of the individual inks, such as surfactants and defoamers, which tend to lower surface tension.

Limiting the addition of components to the inks creates a challenge. For example, surfactants are desirable in inks to enhance the wetting of the substrate, or the drying of the ink. Defoamers are desirable in inks to prevent foaming of the ink which can cause vacuum problems in the printing system. Developing a usable, high image quality ink while eliminating such ingredients has been the problem addressed by this invention.

In addition to limiting bleed and pullback, the ink set of the present invention must satisfy many other competing requirements, as well. For example, the ink must dry and/or be absorbed into the paper within a fraction of a second, yet re-dissolve after an overnight shutdown, to remove the ink from the print head. Also, the ink must form a proper jet at reasonable pressures, and have a reasonable "satellite-free" operating window for stimulation. Each drop must be formed properly, yet have the ability to charge and discharge within a fraction of a micro-second. This puts an upper limit on resistivity. The ink, if dried on charge leads, must not be too conductive, or the nickel will easily be corroded. Furthermore, the ink must have a minimum tincture strength to obtain a reasonable color gamut, and, when printed, must not mottle, bronze, or appear uneven. Finally, the ink must faithfully transmit the intended color. For example, a black must not be too greenish or brownish. Yellow must not have too much orange, and so on.

The inks formulated for the ink set of the present invention have the following properties:

| Property | Black | Cyan | Magenta | Yellow |
|---|---|---|---|---|
| Resistivity (Ohm-cm) | 130 | 405 | 280 | 200 |
| Surface Tension (dyne/cm) | 54 | 57 | 47 | 57 |
| Density (gm/ml) | 1.022 | 1.008 | 1.005 | 1.008 |
| Viscosity (cps) | 1.18 | 1.00 | 0.95 | 1.03 |
| pH (@25° C.) | 10.6 | 10.0 | 10.4 | 9.9 |

The properties of the inks can vary greatly from those shown in the table above, which table is provided for purposes of illustration only. For example, if the surface tensions of the inks are lowered, the variation in the surface tension can be much less than ten. Additionally, as the surface tension equalizes, the density of ink that can be printed increases, positively affecting the color gamut.

The present invention proposes an ink set wherein formulation of the multi-color printer inks specifically limits the surface-modifying ingredients which tend to lower surface tension. The surface tensions of these inks are shown as all higher than typical for existing inks used in ink jet printing. Existing inks have a surface tension range from the low 30's to the mid 40's, significantly lower than the surface tensions exhibited in the table above. However, it should be noted that the ink surface tensions can be higher or lower than shown, as long as the dynes/cm variation amongst the inks is minimized.

In accordance with the present invention, the inks are comprised of at least water and a dye. With a dye surface tension of approximately 60 dynes/cm, the surface tensions of the inks can be close to 50 dynes/cm. However, the essential focus of the invention is to equalize the surface tensions of the inks; and whether the equalized surface tensions are high or low, the essential feature is that, among the inks, the range of those surface tensions have a dynes/cm variation of ten or less. If one ink has a high surface tension and another ink has a low surface tension, the colors will tend to bleed, however, if both inks have a relatively high or relatively low surface tension, bleed is minimized.

By providing an ink set with approximately equalized surface tensions, the percentage of the density of the primary ink which can be printed increases. This, in turn, increases the number of combinations of secondary and tertiary inks. In the existing art, the unwanted effects of color-to-color bleed and mottle are solved by putting down less ink, at the cost of the overall color gamut. With the technique of the present invention, however, depending on the paper, a color gamut of 50–80% of the standard web offset press (SWOP) color gamut can be achieved.

Additionally, the present invention proposes to increase the effectiveness of bleed and pullback minimization by selecting a print order to maximize the effect of equalizing the ink surface tensions. Specifically, the heaviest coverage inks (i.e., black and yellow) are selected to have the shortest time to the dryer, with yellow actually being selected as last to give the brightest color image. Therefore, in a preferred embodiment of the present invention, the print order is cyan, magenta, black and yellow.

To achieve ink surface tensions having a maximum dynes/cm variation of ten, the ink jet ink composition components are selected to minimize or eliminate those having the most effect on the ink surface tension, i.e., surfactants and defoamers. A purification process can be applied to the dye to achieve a dye surface tension of approximately 60 dynes/cm. The resistivity and viscosity can vary, even greatly, as long as the surface tensions are consistently matched. However, the resistivity has an upper limit defined by the requirement that the inks be able to charge and discharge within a fraction of a micro-second. The pH can be maintained at a level greater than nine by adding a pH modifier, such as an amine or other base. Corrosion inhibitors and biocides can also be added to the inks with a negligible effect on surface tension.

The invention has been described in detail with particular reference to certain preferred embodiments thereof, but it will be understood that modifications and variations can be effected within the spirit and scope of the invention.

What is claimed is:

1. A method for defining an ink set for use with a high speed ink jet printing system to print onto a substrate, the method comprising the steps of:

providing a cyan ink, a magenta ink, a black ink and a yellow ink for use in the ink jet printing system for printing continuously variable color images, the inks comprised of at least water and a dye, each of the inks having an ink surface tension;

selecting the ink jet ink composition components, whereby dynes/centimeter variation in the ink surface tension among the inks is in the range of zero to ten; and selecting a print order for the ink set to maximize print quality, wherein the step of selecting a print order for the ink set comprises the step of printing in the order cyan, magenta, black and yellow.

2. A method as claimed in claim 1 wherein the step of selecting the ink jet ink composition components further comprises the step of selecting the ink jet ink components whereby dynes/centimeter variation in the ink surface tension among the at least two ink jet inks is in the range of zero to five.

3. A method as claimed in claim 1 further comprising the step of applying a purification process to the dye to achieve a dye surface tension of approximately 60 dynes/cm.

4. A method as claimed in claim 1 wherein the step of selecting the ink jet ink composition components, whereby dynes/centimeter variation in the ink surface tension among the at least two ink jet inks is in the range of zero to ten, comprises the step of increasing color gamut of the ink set.

5. A method as claimed in claim 1 wherein the substrate comprises uncoated substrates.

6. A method as claimed in claim 1 wherein the substrate comprises ink jet coated substrates.

7. A method as claimed in claim 1 wherein the substrate comprises offset coated substrates.

8. A method as claimed in claim 1 wherein the ink set comprises inks that redissolve after an overnight shutdown.

9. A method as claimed in claim 1 wherein the ink set comprises inks that dry or are absorbed into the substrate in less than a second.

10. A method as claimed in claim 1 wherein the ink set comprises inks that are able to charge and discharge in less than a micro-second.

11. A method as claimed in claim 1 wherein the ink set comprises inks that have a minimum tincture strength.

12. A high speed ink jet printing system to print onto a substrate, the system comprising:

an ink set comprising a cyan ink, a magenta ink, a black ink and a yellow ink for use in the ink jet printing system for printing continuously variable color images, the inks comprised of at least water and a dye, each of the inks having an ink surface tension;

means for selecting the ink jet ink composition components so that dynes/centimeter variation in the ink surface tension among the inks is in the range of zero to ten, means for selecting a print order for the ink set to maximize print quality, wherein the step of selecting a print order for the ink set comprises the step of printing in the order cyan, magenta, black and yellow.

13. A high speed ink jet printing system as claimed in claim 12 wherein the means for selecting the ink jet ink composition components further comprises means for selecting the ink jet ink components whereby dynes/centimeter variation in the ink surface tension among the at least two ink jet inks is in the range of zero to five.

14. An ink set as claimed in claim 12 wherein the means for selecting the ink jet ink composition components so that dynes/centimeter variation in the ink surface tension among the at least two ink jet inks is in the range of zero to ten, comprises means for increasing color gamut of the ink set.

* * * * *